(12) United States Patent
Cai et al.

(10) Patent No.: US 7,894,859 B2
(45) Date of Patent: Feb. 22, 2011

(54) PRIVACY PROTECTION IN NETWORK-BASED PHONEBOOKS

(75) Inventors: Yigang Cai, Naperville, IL (US); Shiyan Hua, Lisle, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1273 days.

(21) Appl. No.: 11/374,358

(22) Filed: Mar. 13, 2006

(65) Prior Publication Data

US 2007/0213034 A1 Sep. 13, 2007

(51) Int. Cl.
H04M 1/00 (2006.01)
H04B 1/38 (2006.01)

(52) U.S. Cl. .................. 455/564; 455/412.1; 455/403

(58) Field of Classification Search .............. 455/403, 455/412.1, 564
See application file for complete search history.

(56) References Cited

U.S. PATENT DOCUMENTS

| | | | |
|---|---|---|---|
| 6,076,093 A * | 6/2000 | Pickering | 1/1 |
| 6,658,455 B1 * | 12/2003 | Weinman, Jr. | 709/203 |
| 7,085,257 B1 * | 8/2006 | Karves et al. | 370/352 |
| 2002/0114438 A1 * | 8/2002 | Ganugapati | 379/201.01 |
| 2006/0148496 A1 * | 7/2006 | Zhu et al. | 455/466 |
| 2006/0285663 A1 * | 12/2006 | Rathus et al. | 379/88.22 |

FOREIGN PATENT DOCUMENTS

WO  WO03/030450  4/2003

* cited by examiner

*Primary Examiner*—Tuan H Nguyen
(74) *Attorney, Agent, or Firm*—Duft Bornsen & Fishman, LLP

(57) ABSTRACT

Phonebook systems and associated methods are disclosed that provide a mechanism for protecting private information of a contact from being published in a network-based phonebook. A typical network-based phonebook service allows subscribers to set up network-based phonebooks, where each phonebook includes one or more contacts and associated contact information. Before contact information for a contact is included in a network-based phonebook for a subscriber, a phonebook system identifies privacy criteria for the contact. The privacy criteria may be predefined by the contact, predefined by the service provider, or predefined by another entity. The phonebook system then processes the privacy criteria to identify the contact information for the contact that is authorized to be included in the network-based phonebook. The processing system may then include the authorized contact information in the network-based phonebook, and block the unauthorized contact information from being included in the network-based phonebook.

18 Claims, 4 Drawing Sheets

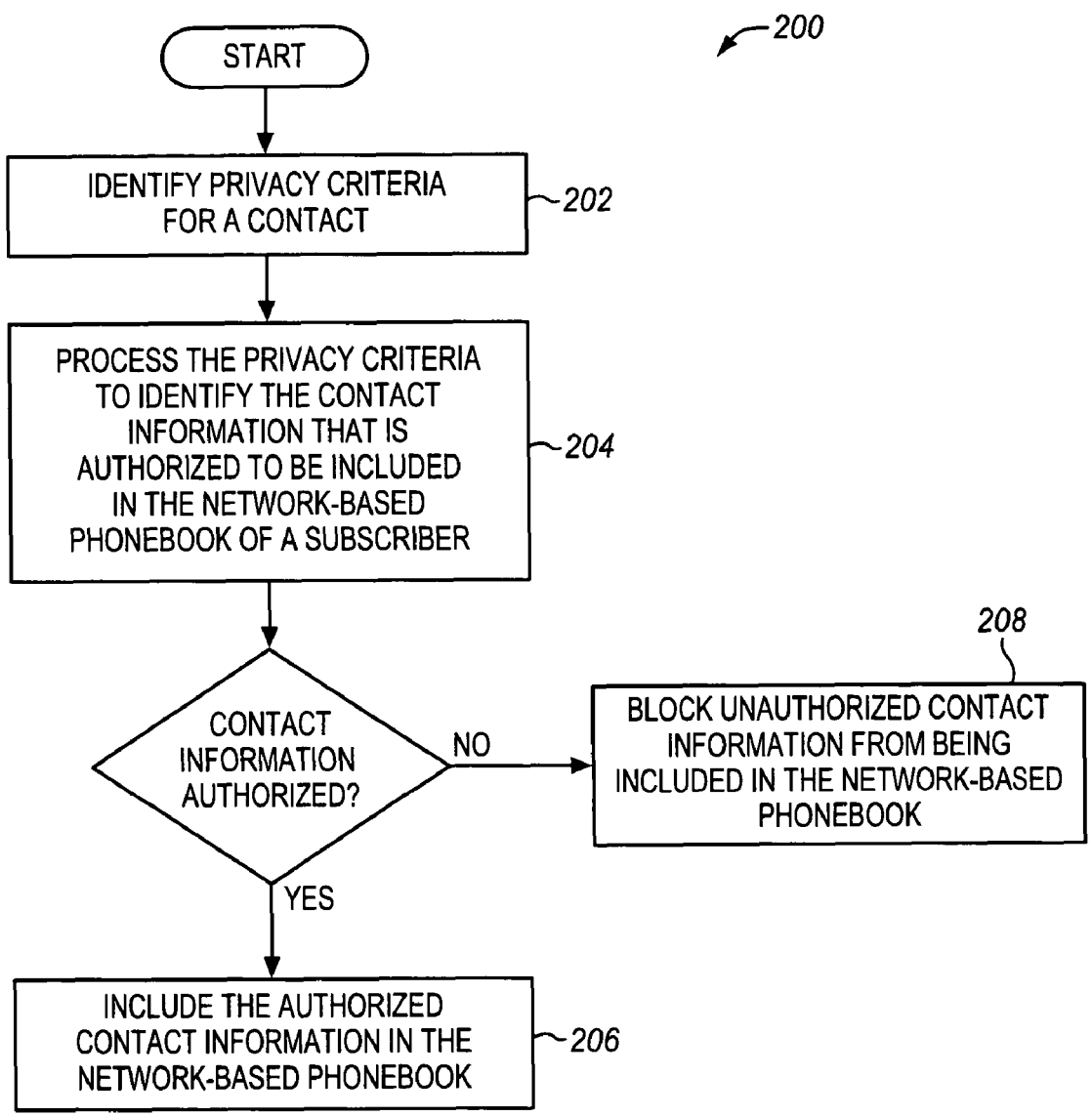

FIG. 3

NETWORK-BASED PHONEBOOK
300

| CONTACT | CONTACT INFORMATION |
|---|---|
| ☐ CONTACT 1 – | DIRECTORY NUMBER 1<br>DIRECTORY NUMBER 2<br>EMAIL ADDRESS<br>MAILING ADDRESS<br><br>PRESENCE  STATUS<br>VOICE  ACTIVE<br>EMAIL  ACTIVE<br>IM  INACTIVE<br>TEXT  ACTIVE<br>VIDEO  INACTIVE<br><br>LOCATION<br>X, Y, COORDINATES |
| ☐ CONTACT 2 – | DIRECTORY NUMBER 1<br>EMAIL ADDRESS<br><br>PRESENCE  STATUS<br>VOICE  INACTIVE<br>EMAIL  ACTIVE<br>TEXT  INACTIVE<br><br>LOCATION<br>X, Y, COORDINATES |
| ☐ CONTACT 3 – | DIRECTORY NUMBER 1<br>EMAIL ADDRESS<br><br>PRESENCE  STATUS<br>VOICE  ACTIVE<br>EMAIL  ACTIVE<br>IM  ACTIVE<br>TEXT  ACTIVE<br><br>LOCATION<br>X, Y, COORDINATES |
| ☐ CONTACT 4 – | DIRECTORY NUMBER 1<br>EMAIL ADDRESS<br><br>PRESENCE  STATUS<br>VOICE  ACTIVE<br>EMAIL  INACTIVE<br>IM  INACTIVE<br>TEXT  INACTIVE<br><br>LOCATION<br>X, Y, COORDINATES |

302

PRIVACY PROTECTION IN NETWORK-BASED PHONEBOOKS

BACKGROUND OF THE INVENTION

1. Field of the Invention

The invention is related to the field of communication networks and, in particular, to providing privacy protection for information that is included in network-based phonebooks.

2. Statement of the Problem

People use multiple different access devices and services for communicating with one another. For instance, an individual may have a mobile phone for placing calls, a mobile phone or PC having email capability, a mobile phone or PC having Instant Messaging (IM) capability, etc. Each one of these access devices/applications typically has the functionality for some type of a contact list, address book, phonebook, etc. A mobile phone typically has a phonebook that is managed and maintained on the phone by the individual. An email application on a PC typically has a contact list that is managed and maintained on the PC by the individual. An IM application on a PC or mobile phone typically has a buddy list that is managed and maintained by the individual. Unfortunately, the individual has to manage and maintain these separate lists on one or more access devices.

Some service providers are offering a network-based phonebook service that allows an individual to store his/her contact lists, buddy lists, address books, etc., in a centralized phonebook that is stored in the network. Copies of the network-based phonebook can then be downloaded to the access devices (mobile phone, PC, etc.) of the individual. If a change or addition is made to the phonebook on an access device, then the master copy of the phonebook on the network is automatically updated. The network-based phonebook allows for a single, synchronized phonebook that is accessible and updateable from almost any access device. Also, if a mobile phone is lost or a PC is damaged, then the network-based phonebook will be safe in the network.

When setting up the network-based phonebook, an individual may enter one or more contacts and information associated with the contact(s). The contact information may include one or more telephone numbers for the contact, an email address for the contact, a mailing address, etc. In some of the network-based phonebook services, the network also identifies certain contact information that is available to the network, and includes that contact information in the network-based phonebook. The network may identify a presence and/or status of the contact on the network, such as whether the mobile device of the contact is registered with a wireless network, whether the contact is logged in to his/her email, whether the contact has signed on for IM, etc. The network may identify a location of a contact using a mobile device and include the location of the contact in the network-based phonebook.

One problem with present network-based phonebook services is that some of the contact information included in the phonebook may be considered private by the contacts. For instance, one contact may not want to have his/her location published in a network-based phonebook for a subscriber to view. Another contact may not want the network-based phonebook to indicate that he/she is available though a mobile phone during work hours. The contacts presently do not have control over what information is published in the network-based phonebook.

SUMMARY OF THE SOLUTION

The invention solves the above and other problems by providing a mechanism to protect private information of contacts from being included in network-based phonebooks. Contacts may define privacy criteria that are used to filter the contact information included in network-based phonebooks. By filtering the contact information, private information of the contacts can advantageously be blocked from being included network-based phonebooks. Such a protection was not previously available.

One embodiment of the invention is a phonebook system that provides a network-based phonebook service to subscribers. A network-based phonebook service allows the subscribers to set up network-based phonebooks, where each phonebook includes one or more contacts and associated contact information. The network-based phonebooks are stored in a phonebook database of the phonebook system. Before contact information for a contact is included in a network-based phonebook for a subscriber, a processing system of the phonebook system identifies privacy criteria for a contact listed in the phonebook. The privacy criteria may be predefined by the contact, predefined by the service provider, or predefined by another entity. The processing system then processes the privacy criteria to identify the contact information for the contact that is authorized to be included in the network-based phonebook for the subscriber. The processing system may then include the authorized contact information in the network-based phonebook for the subscriber. The processing system may also block the unauthorized contact information from being included in the network-based phonebook for the subscriber.

The invention may include other exemplary embodiments described below.

DESCRIPTION OF THE DRAWINGS

The same reference number represents the same element on all drawings.

FIG. 2 is a flow chart illustrating a method of operating a phonebook system in an exemplary embodiment of the invention.

FIG. 3 illustrates a network-based phonebook as stored in a phonebook database in an exemplary embodiment of the invention.

DETAILED DESCRIPTION OF THE INVENTION

FIGS. 1-4 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
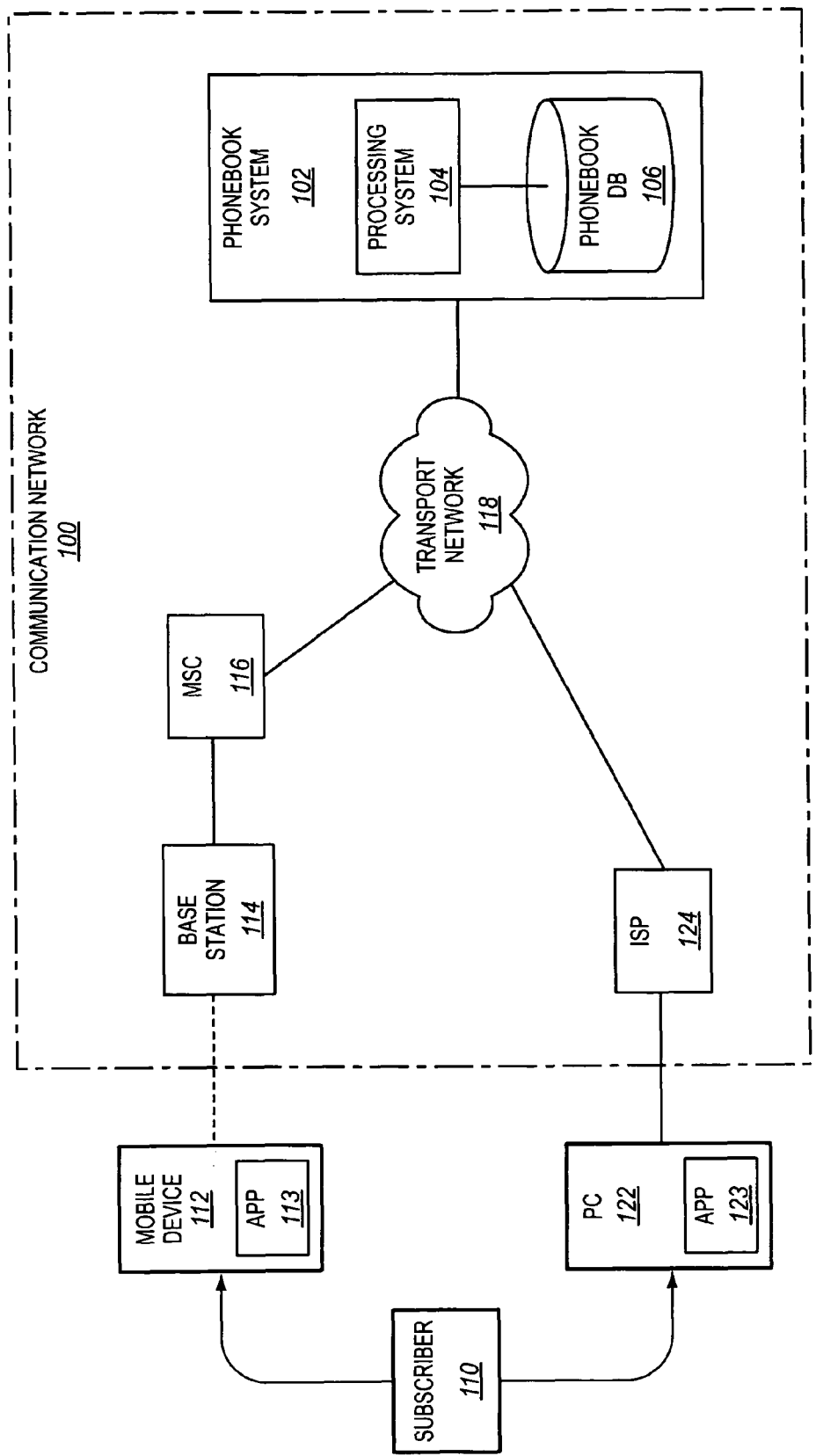
FIG. 1 illustrates a communication network in an exemplary embodiment of the invention.

FIG. 1 illustrates a communication network 100 in an exemplary embodiment of the invention. Communication network 100 may comprise a wireless network, a wireline network, an IMS network, or a combination of networks. Communication network 100 is adapted to provide a network-based phonebook service through phonebook system 102 to a subscriber 110 of the service. The network-based phonebook service provides a centralized phonebook for subscriber 110 that is stored and maintained in communication network 100. Subscriber 110 may access the network-based phonebook through multiple access devices. In FIG. 1, subscriber 110 is illustrated as being able to access the network-based phonebook through a mobile device 112 and a PC 122. Mobile device 112 communicates with phonebook system 102 through a base station 114, a Mobile Switching Center (MSC) 116, and a transport network 118. PC 122 communicates with phonebook system 102 through an Internet Service Provider (ISP) 124 and transport network 118.

Phonebook system 102 includes a processing system 104 and a phonebook database 106. Processing system 104 comprises any computer, integrated circuit, or logic circuitry adapted to setup, manage, maintain, or otherwise handle network-based phonebooks for subscribers of the phonebook service. Processing system 104 refers to a single processing device or a group of inter-operational processing devices. The operation of processing system 104 may be controlled by instructions executable by processing system 104. Some examples of instructions are software, program code, and firmware. Phonebook database 106 comprises any system(s) or server(s) adapted to store network-based phonebooks for the subscribers of the phonebook service. Processing system 104 and phonebook database 106 may be included in the same network node or may be distributed among multiple network nodes.

The network-based phonebooks stored by phonebook database each include one or more contacts and associated contact information. According to features and aspects herein, phonebook system 102 operates differently than prior systems to protect against private contact information of a contact from being published or included in the network-based phonebooks. Assume for example that subscriber 110 has subscribed to a network-based phonebook through phonebook system 102. FIG. 2 is a flow chart illustrating a method of operating phonebook system 102 in an exemplary embodiment of the invention. The steps of method 200 will be described with reference to FIG. 1. The steps of the flow chart in FIG. 2 are not all inclusive and may include other steps not shown.

To protect against publishing private contact information, processing system 104 identifies privacy criteria for a contact in the network-based phonebook in step 202. Privacy criteria comprises any information or data used to determine what contact information is allowed to be included in a network-based phonebook. The privacy criteria may be defined by the contact, by the service provider offering the network-based phonebook service, or by another entity. The service provider may provide a web site to allow a contact to define privacy criteria through a PC or other web-enabled device, or may provide another mechanism that allows the contact to define the privacy criteria through a mobile device or other device. The service provider may also define default privacy criteria that the contact may change as desired.

In step 204, processing system 104 processes the privacy criteria to identify the contact information for the contact that is authorized to be included in the network-based phonebook. If certain contact information is authorized according to the privacy criteria, then processing system 104 includes the authorized contact information in the network-based phonebook in step 206. If certain contact information is not authorized according to the privacy criteria, then processing system 104 blocks the unauthorized contact information from being included in the network-based phonebook in step 208. By filtering the contact information based on the privacy criteria before the contact information is included in the network-based phonebook, private information of the contact may be excluded from the network-based phonebook and/or other network-based phonebooks. Method 200 may be performed for one or more of the contacts in the network-based phonebook.

Method 200 may be invoked by different triggers. For instance, if a contact changes their privacy criteria, then processing system 104 may identify the network-based phonebooks of which that contact is included, and perform method 200 to determine which contact information is authorized and which contact information is not authorized based on the new privacy criteria. Another trigger may be if phonebook system 102 identifies new contact information for a contact, or identifies a change to the contact information for the contact. Responsive to the new or changed contact information, processing system 104 performs method 200 to determine whether the new or changed contact information should be included in one or more network-based phonebooks. Another trigger may be if subscriber 110 attempts to enter new contact information for the contact in a network-based phonebook. Another trigger may be a time change based on the contact's time criterion. There may be many other triggers for method 200 to provide protection of private information for the contacts in the network-based phonebook.

FIG. 3 illustrates a network-based phonebook 300 as stored in phonebook database 106 in an exemplary embodiment of the invention. Phonebook database 106 may store many phonebooks, such as phonebook 300, for many subscribers. In this embodiment, phonebook 300 includes a plurality of entries 302. Each entry identifies a contact and information associated with the contact. A contact may be identified by a name, a nickname, a user name, etc. The contact information may include any information that is desirable to be included in phonebook 300. As an example, the contact information may include one or more directory numbers of the contact, an email address of the contact, and a mailing address of the contact. The contact information may also include a presence of the contact on the communication network 100. The presence indicates the means by which the contact can communicate (also referred to as communication capabilities), such as voice (landline phone, mobile phone, etc.), video, email, Short Message Service (SMS or Multimedia Message Service (MMS)), Instant Message (IM), text message, voice mailbox (VMB), etc. The contact information may also include an indication of the status of the contact on communication network 100. For instance, status may indicate that the contact is logged onto email and his/her mobile device is registered. The contact information may also include the location of a contact, such as a geographic location (e.g., latitude/longitude or address), a network location, or another location of the contact. The contact information may also include an indication of mood, such as smile, cry, angry, surprise, confuse, embarrassed, sad, disappointed, etc. The contact can provision mood criteria for phonebook subscribers. The contact information may also include a note the contact leaves in the network which the subscribers can retrieve from the network phonebook. An example of a note from a contact could be "I am vacationing in Italy".

Network-based phonebook 300, as stored in phonebook database 106, is accessible to subscriber 110 through access devices (see FIGS. 1-2). Mobile device 112 and PC 122 each include an application 113 and 123, respectively, that accesses network-based phonebook 300 as stored in phonebook database 106. If application 113 is invoked in mobile device 112, then application 113 transmits a request for an update for the network-based phonebook 300 to phonebook system 102. The request may include an indicator for subscriber 110 or an indicator for mobile device 112. Responsive to the request, processing system 104 locates the network-based phonebook 300 for subscriber 110 in phonebook database 106. Processing system 104 makes a copy of the network-based phonebook 300, and transmits the copy of the network-based phonebook 300 to mobile device 112. Application 113 is thus updated with the most current version of the network-based phonebook 300. Application 113 periodically requests updates from phonebook system 102, such as through registration requests that are typically used by mobile device 112 to re-register with communication network 100. Application 123 in PC 122 operates substantially similar to obtain a copy of the network-based phonebook 300 for viewing by subscriber 110.

Figure 4:
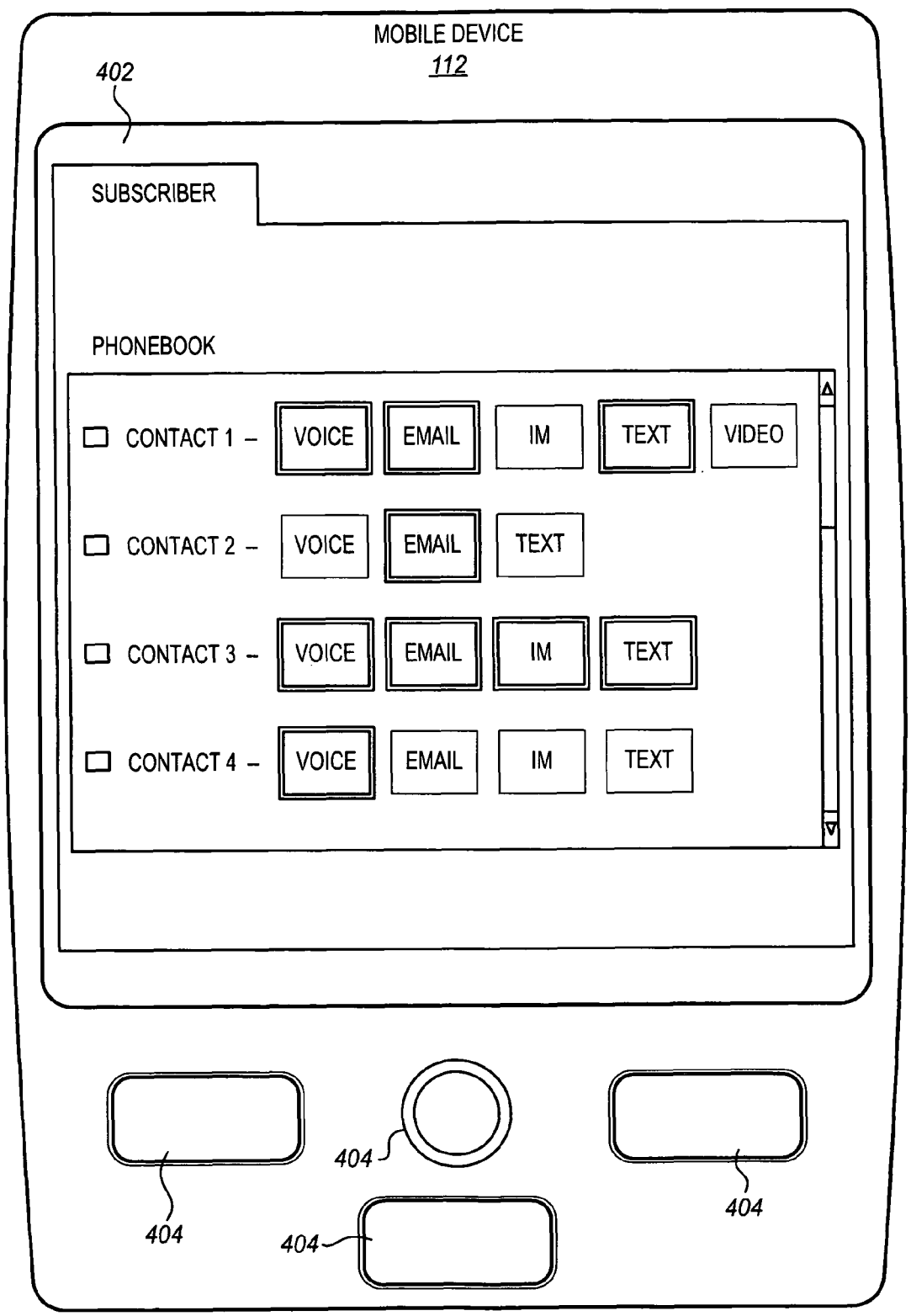
FIG. 4 illustrates a network-based phonebook as provided by an application in a mobile device in an exemplary embodiment.

FIG. 4 illustrates mobile device 112 displaying the network-based phonebook 300 in an exemplary embodiment. In this embodiment, mobile device includes a display 402 and controls 404, such as buttons, a pointing device, etc. When application 113 receives the copy of network-based phonebook 300, application 113 processes the information to display Contacts 1-4 and their associated contact information on display 402. In this embodiment, four Contacts are illustrated but more or less contacts may be included in other embodiments. The contact information for Contacts 1-4 includes presence, status, and location information. The actual contact information shown for each contact depends on the privacy criteria defined by each contact.

For instance, Contact 1 includes a presence of voice, video, email, IM, and text as illustrated by the icons next to Contact 1. Status information for Contact 1 is also illustrated by a box around the appropriate presence icon of Contact 1. The box around the voice icon means that the mobile device (or other phone) of Contact 1 is registered with communication network 100. The box around the email icon means that Contact 1 is currently logged into his/her email server. The box around the text icon means that Contact 1 is able to receive text messages. The lack of a box around the video icon means that Contact 1 does not have his/her video camera active. The lack of a box around the IM icon means that Contact 1 has not logged in to the IM service. Similar presence and status information is included for Contacts 2-4.

If subscriber 110 operating mobile device 112 selects one of the contacts, such as Contact 1, then more contact information may be provided for Contact 1. For instance, application 113 in mobile device 112 may display location information for Contact 1, such as on a map to show the geographic location of Contact 1.

The contact information in the network-based phonebook 300 illustrated in FIGS. 3-4 may be provided by subscriber 110. For instance, subscriber 110 may add a new entry in network-based phonebook 300 through mobile device 112 or PC 122, or may edit an existing entry. Responsive to the addition or edit by subscriber 110, application 113 or 123 transmits the update to phonebook system 102. Phonebook system 102 then amends the network-based phonebook 300 for subscriber 110 based on the updates, if the updates are authorized by the privacy criteria for the contacts.

Phonebook system 102 may also provide some of the contact information in the network-based phonebook 300. For instance, phonebook system 102 may be able to identify a location for a contact, such as by querying network nodes (not shown) having location information for network users. Phonebook system 102 may also be able to provide status of a contact on communication network 100, such as by querying a subscriber database (not shown) to determine if a mobile device of the contact is presently registered, or by querying an email server to determine if the contact is presently logged onto his/her email or IM service.

According to the present state of the art, phonebook system 102 includes all of the contact information for the contacts in network-based phonebook 300. If the contact information is provided by subscriber 110, then phonebook system 102 includes the contact information in network-based phonebook 300 for subscriber 110. If the contact information is provided by phonebook system 102 (e.g., location or status information), then phonebook system 102 includes the contact information in network-based phonebook 300. According to features and aspects herein, phonebook system 102 processes privacy criteria before including contact information in network-based phonebook 300 so that unauthorized (private) contact information is not included in network-based phonebook.

Contact information of a contact may be included in network-based phonebooks unless the contact takes the active step of defining the privacy criteria to block certain contact information. Alternatively, the service provider may define default privacy criteria to protect information that the service provider or society may deem private. The contact may then have to take the active step of changing the default privacy criteria to allow certain contact information or block other contact information. For instance, the location of a contact may be deemed private, and the contact would have to change the default privacy criteria in order to allow their location to be included in network-based phonebooks.

As described above, the privacy criteria may take on many forms. In one example, the privacy criteria may include subscriber criterion. Subscriber criterion comprises any data regarding subscribers having a network-based phonebook that is used to filter which contact information is included in the network-based phonebook. The subscribers may be identified by a directory number, a name, a SIP URI or other network address, etc. Through the subscriber criterion, a contact may define which subscribers are allowed to include particular contact information in their network-based phonebook. For instance, the contact may define a black-list of subscribers not authorized to include contact information of the contact their network-based phonebook. Similarly, the contact may define a white-list of subscribers that are authorized to include contact information of the contact their network-based phonebook.

In another example, the privacy criteria may include time criterion. Time criterion comprises any data regarding time periods used to filter which contact information is included in a network-based phonebook. Through the time criterion, a contact may define particular time periods in which particular contact information is included in or blocked from a network-based phonebook. A time period may be defined by a start time (e.g., month/date, hour, minute, etc.) and an end time. The contact may define one or more time periods in which contact information is not authorized to be included in a network-based phonebook. For instance, a contact may define that their contact information is not to be included in a network-based phonebook during the night-time period. The contact may additionally or alternatively define one or more time periods in which contact information is authorized to be included in a network-based phonebook. For instance, a contact may define that their contact information is authorized to be included in a network-based phonebook during the workday period or during the daytime period.

In another example, the privacy criteria may include location criterion. Location criterion comprises any data regarding the location of a contact that is used to filter which contact information is included in a network-based phonebook. The location of a contact may be a geographic location, a network location, or any other location of the contact. A contact may define a black-list of locations that are not authorized to be included in a network-based phonebook. Similarly, the contact may define a white-list of locations of the contact that are authorized to be included in a network-based phonebook.

In another example, the privacy criteria may include communication criterion. Communication criterion comprises any data regarding the presence and/or status of the contact that is used to filter which contact information is included in a network-based phonebook. Through the communication criterion, a contact may define which presence and/or status information of the contact is authorized to be included in a network-based phonebook. Similarly, the contact may define particular presence and/or status information that is not authorized to be included in a network-based phonebook.

The above-described criteria may be combined by a contact to form the desired privacy criteria of the contact. As an example, a contact may want to define what contact information (e.g., presence, status, and location) is included in their boss's network-based phonebook. The contact may define the privacy criteria such that during the work day time period, the phonebook of the boss indicates that the contact is available through the office phone, office email, and a mobile phone. The contact may further define that the location of the contact is authorized to be included in the phonebook of the boss during the work day time period. The contact may further define the privacy criteria such that after the work day time period, the phonebook of the boss indicates that the contact is unavailable, only available through office email, or only available through another means. The contact may further define that the location of the contact is not authorized to be included in the phonebook of the boss after the work day.

In a similar manner, the contact may want to define what contact information is included in their friend's network-based phonebook. The contact may define the privacy criteria such that during the work day time period, the phonebook of the friend only indicates that the contact is available through text messaging. The contact may further define that the location of the contact is not authorized to be included in the phonebook of the friend during the work day. The contact may further define the privacy criteria such that after the work day time period, the phonebook of the friend indicates that the contact is available through a mobile phone, a home phone, private email, IM, and text messaging. The contact may further define that the location of the contact is authorized to be included in the phonebook of the friend after the work day.

Although specific embodiments were described herein, the scope of the invention is not limited to those specific embodiments. The scope of the invention is defined by the following claims and any equivalents thereof.

We claim:

1. A phonebook system for providing a network-based phonebook, the phonebook system comprising: a phonebook database adapted to store a network-based phonebook for a subscriber, wherein the network-based phonebook includes at least one contact; and a processing system adapted to identify privacy criteria for the at least one contact in the network-based phonebook, process the privacy criteria to identify contact information for the at least one contact that is authorized to be included in the network-based phonebook for the subscriber, and include the authorized contact information in the network-based phonebook for the subscriber; wherein the processing system is further adapted to block the unauthorized contact information from being included in the network-based phonebook for the subscriber.

2. The phonebook system of claim 1 wherein the privacy criteria for the at least one contact includes a black-list of subscribers not authorized for particular contact information.

3. The phonebook system of claim 1 wherein the privacy criteria for the at least one contact includes a white-list of subscribers authorized for particular contact information.

4. The phonebook system of claim 1 wherein the privacy criteria for the at least one contact includes a time period during which particular contact information is not authorized to be included in the network-based phonebook.

5. The phonebook system of claim 1 wherein the privacy criteria for the at least one contact includes a time period during which particular contact information is authorized to be included in the network-based phonebook.

6. The phonebook system of claim 1 wherein the privacy criteria for the at least one contact includes at least one location that is not authorized to be included in the network-based phonebook.

7. The phonebook system of claim 1 wherein the privacy criteria for the at least one contact includes presence information of the at least one contact that is not authorized to be included in the network-based phonebook.

8. A method of providing a network-based phonebook for a subscriber, the method comprising: storing the network-based phonebook for the subscriber, wherein the network-based phonebook includes at least one contact; identifying privacy criteria for the at least one contact in the network-based phonebook; processing the privacy criteria to identify contact information for the at least one contact that is authorized to be included in the network-based phonebook for the subscriber; and including the authorized contact information in the network-based phonebook for the subscriber; and blocking the unauthorized contact information from being included in the network-based phonebook for the subscriber.

9. The method of claim 8 wherein the privacy criteria for the at least one contact includes a black-list of subscribers not authorized for particular contact information.

10. The method of claim 8 wherein the privacy criteria for the at least one contact includes a white-list of subscribers authorized for particular contact information.

11. The method of claim 8 wherein the privacy criteria for the at least one contact includes a time period during which particular contact information is not authorized to be included in the network-based phonebook.

12. The method of claim 8 wherein the privacy criteria for the at least one contact includes a time period during which particular contact information is authorized to be included in the network-based phonebook.

13. The method of claim 8 wherein the privacy criteria for the at least one contact includes at least one location that is not authorized to be included in the network-based phonebook.

14. The method of claim 8 wherein the privacy criteria for the at least one contact includes presence information of the at least one contact that is not authorized to be included in the network-based phonebook.

15. A method of operating a communication network for providing a network-based phonebook service, the method comprising:

storing a network-based phonebook for a subscriber, wherein the network-based phonebook includes at least one contact;

identifying privacy criteria for the at least one contact responsive to a trigger;

processing the privacy criteria to identify contact information for the at least one contact that is authorized to be included in the network-based phonebook for the subscriber;

including the authorized contact information in the network-based phonebook for the subscriber;

blocking the unauthorized contact information from being included in the network-based phonebook for the subscriber;

receiving a request for the network-based phonebook from an access device of the subscriber; and transmitting a copy of the network-based phonebook to the access device of the subscriber responsive to the request.

16. The method of claim 15 wherein the trigger comprises a change to the contact information for the at least one contact.

17. The method of claim 15 wherein the trigger comprises a change to the privacy criteria of the at least one contact.

18. The method of claim 15 further comprising:

providing a mechanism to allow the at least one contact to define the privacy criteria.

* * * * *